United States Patent [19]

O'Neill

[11] Patent Number: 4,627,629
[45] Date of Patent: Dec. 9, 1986

[54] TRUCK TRAILER ADAPTED TO CARRY FLUID AND DRY FREIGHT AND METHOD FOR LOADING THE SAME

[75] Inventor: Hugh O'Neill, Chagrin Falls, Ohio

[73] Assignee: Transport Investment Corp., Cleveland, Ohio

[21] Appl. No.: 627,350

[22] Filed: Jul. 3, 1984

[51] Int. Cl.[4] ............................................. B60P 3/22
[52] U.S. Cl. ..................................... 280/5 D; 105/359
[58] Field of Search ............. 280/5 D, 5 C, 5 E; 220/1.5, 22; 296/24 R; 105/355, 359, 361

[56] References Cited

U.S. PATENT DOCUMENTS

| | | | |
|---|---|---|---|
| 216,506 | 6/1879 | Brown | 105/359 |
| 583,660 | 6/1897 | Rodgers | 105/359 |
| 1,389,396 | 8/1921 | Sylvester | 105/359 |
| 1,946,834 | 2/1934 | Brown | 280/5 D |
| 2,271,660 | 2/1942 | Norbom | 220/1.5 |
| 2,723,862 | 11/1955 | Dalglish | 280/5 C |
| 3,146,017 | 8/1964 | Yeary | 296/24 R |
| 3,175,520 | 3/1965 | Talmey | 220/1.5 |
| 3,222,099 | 12/1965 | Swallert | 280/5 D |
| 4,054,226 | 10/1977 | Bjelland | 220/1.5 |

FOREIGN PATENT DOCUMENTS

| | | | |
|---|---|---|---|
| 2209327 | 9/1973 | Fed. Rep. of Germany | 296/24 R |
| 2022057 | 12/1979 | United Kingdom | 220/1.5 |

Primary Examiner—Love, John J.
Assistant Examiner—Dukes, Mark C.
Attorney, Agent, or Firm—Renner, Otto, Boisselle & Lyon

[57] ABSTRACT

A truck trailer adapted to carry fluid and dry freight includes two spaced fluid carrying tanks respectively positioned adjacent the front and rear ends of the trailer and a dry freight section between the two tanks. The rear fluid carrying tank is selectively removable from the trailer to allow dry freight to be loaded through the rear end of the trailer into the dry freight cargo section of the trailer.

4 Claims, 3 Drawing Figures

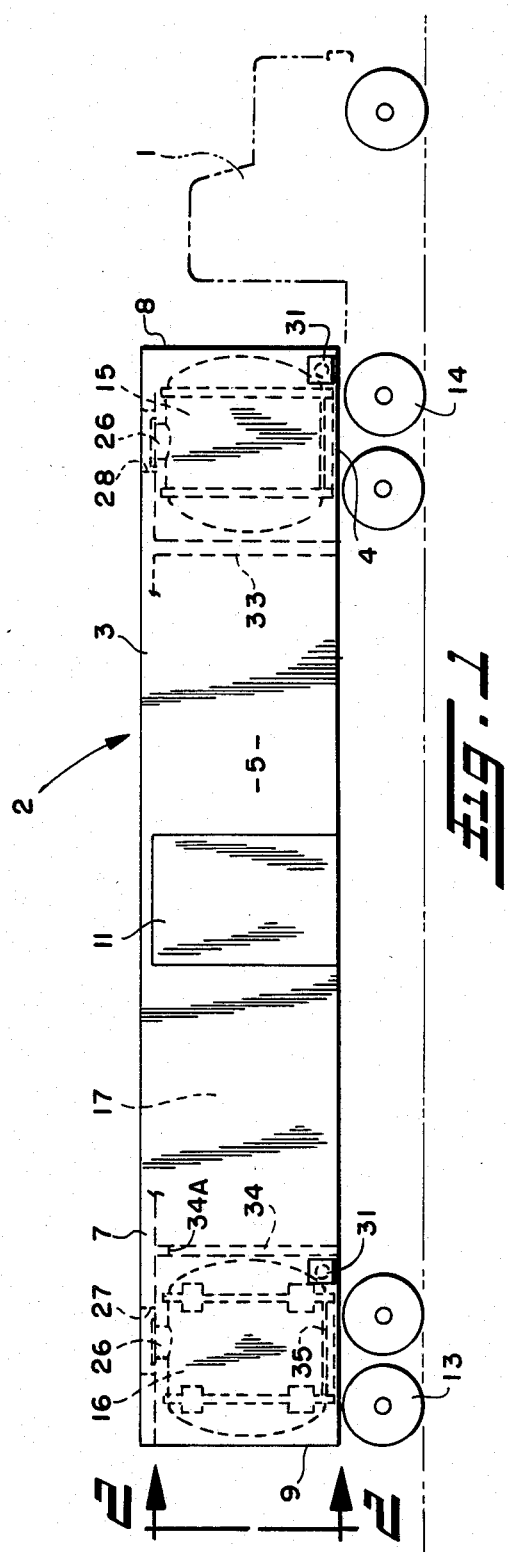

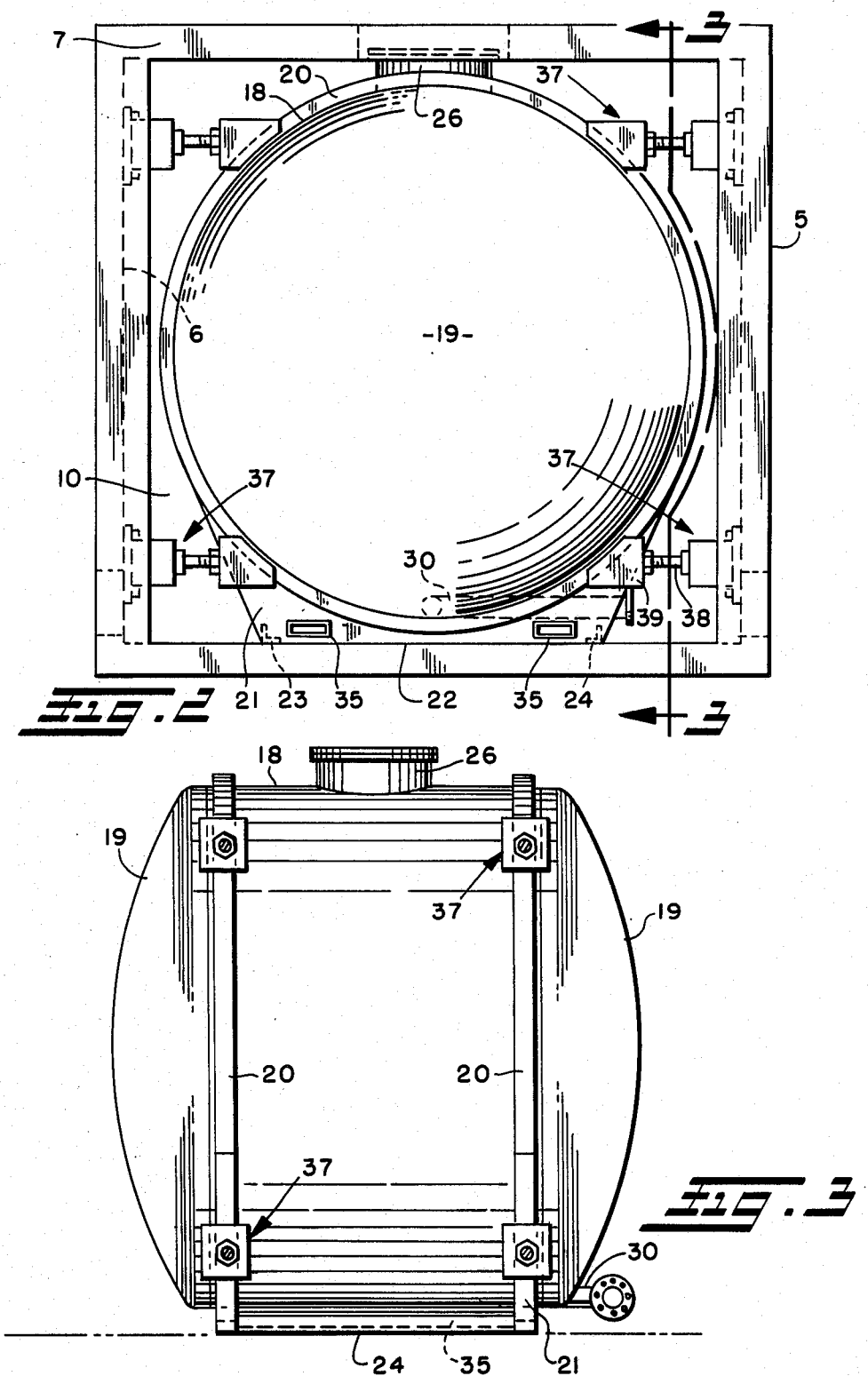

TRUCK TRAILER ADAPTED TO CARRY FLUID AND DRY FREIGHT AND METHOD FOR LOADING THE SAME

FIELD OF INVENTION

The present invention relates to a truck trailer adapted to carry fluid or dry freight.

BACKGROUND OF THE INVENTION

Truck trailers are conventionally made to haul either exclusively dry freight or exclusively liquid or fluid freight. The dry freight trailer conventionally consists of an elongated generally rectangular trailer body having rear and sometimes side doors for loading and unloading. Liquid or fluid trailers conventionally consist of tanks or hoppers loaded from the top and unloaded from the bottom.

The liquid freight tankers often deliver their loads to destinations where dry freight could be picked up and returned to the point of origin. However, since dry freight cannot be handled, the tankers must either dead head back to the point of origin or must dead head to another source of fluid freight. Similar load and dead head factors exist in hauling dry freight in trailers. Dead heading is obviously inefficient from equipment, energy utilization and cost standpoints.

Previous attempts have been made to provide a trailer capable of universally handling either dry or liquid freight. In one such attempt, a collapsible rubber reservoir was used which occupied little space when dry freight was carried and could be filled for liquid freight. This rubber reservoir attempt was generally unsuccessful for several reasons. For example, the rubber reservoir was hard to load and unload, was hard to clean and was difficult to handle because of its bulk, weight and flexability. Moreover, the rubber reservoir, when filled, was not particularly stable and the liquid load had a tendency to shift affecting the load balance and force distribution on the trailer.

In a second attempt, a central fluid hopper was employed with fore and aft dry freight storage compartments positioned generally beneath the converging hopper walls. This attempt was also generally unsuccessful for several reasons. For example, the limited volumes of liquid or dry freight that could be handled were not cost effective and the dry freight was difficult to load and unload because of the position and limited volume of the two compartments and limited access to the two compartments for loading and unloading.

Recently, the rules and laws governing trailer size and weight have been modified to allow increased trailer width, length and height and increased unloaded and loaded trailer weight. Federally, a trailer may now be 48 feet long, 13 feet-6 inches high and 102 inches wide, and the entire loaded weight of the tractor and trailer may be 80,000 pounds. Applicant has considered these new volume and weight regulations in developing the trailer of the present invention.

SUMMARY OF THE INVENTION

The principle object of the present invention is to provide a truck trailer that is adapted to carry liquid and dry freight with efficient loading and unloading and with proper load distribution.

It is another object of the present invention to have two spaced liquid tanks generally over the running gear of the tractor and trailer, with dry cargo space therebetween. This arrangement of tanks and dry cargo space provides for proper load distribution in either the unloaded or loaded conditions of the trailer.

It is still another object of the present invention to have the rear tank be selectively removable. By having the rear tank removable, dry freight may be loaded from the rear of the trailer to the dry freight section or compartment behind the front tank. The rear tank may then be replaced in the trailer to equalize load distribution and provide sufficient tank capacity for a return run with liquid freight.

It is still another object of the present invention to provide bulk heads extending across the trailer at both ends of the dry freight section to enclose the dry freight and segregate the same from the front and rear tanks. In such case, the rear bulkhead is removable and/or has a door or opening therein to provide access to the dry freight section from the rear of the trailer.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

DESCRIPTION OF THE DRAWINGS

In the drawings:

FIG. 1 is a side elevation of the trailer of the present invention with the front and rear tanks and bulkheads being shown in hidden lines;

FIG. 2 is a rear elevation of the trailer taken along the plane 2—2 in FIG. 1 showing the rear tank and a clamping mechanism for the same;

FIG. 3 is side elevation of the rear tank taken along the plane 3—3 in FIG. 2.

DETAILED DESCRIPTION OF THE PREFERRED EMBODIMENT

Turning now in more detail to the drawings and initially to FIG. 1, a truck tractor 1 is shown hitched to the trailer of the present invention, which has been indicated generally at 2. The trailer 2 includes an elongated generally hollow body 3 consisting of bed 4, sidewalls 5 and 6, top wall 7, front wall 8 and rear wall or end 9. The rear end 9 of the trailer body 3 has an opening 10 therein which may be covered by a door or doors or by other restraint means such as a chain curtain or the like. The trailer 2 may also have a side door 11 provided in sidewall 5 of the trailer body 3. This trailer body 3 is mounted on and movably supported by rear running gear 13 on the trailer and front running gear 14 on tractor 1. The trailer is provided with conventional extendable legs (not shown) for supporting the same when unhitched from the tractor.

The trailer 2 of the present invention includes a front liquid or fluid tank 15 and a rear liquid or fluid tank 16. Tank 15 is preferably fixed to the trailer body 3 generally above the tractor running gear 14, and the tank 16 is removably secured to the trailer body 3 generally above the rear running gear 13. The space in the trailer body 3 between the tanks 15 and 16 forms the dry freight or cargo compartment 17 as will be described in more detail hereinafter. The tanks 15 and 16 are preferably enclosed within the trailer body during normal operation and are of similar construction as best illustrated in FIGS. 2 and 3.

The tanks are preferably made from stainless steel, although other tank forms are contemplated including, but not being limited to, aluminum, lined metal and fiberglass. As shown, the tanks are formed by a central shell 18 and two opposed heads or ends 19 connected thereto. The connection of the heads 19 to the central shell 18 is stengthened by spaced reinforcing rings 20 to provide a fluid tight tank. The tanks are each supported by two spaced bolsters 21 respectively connected to and extending downwardly from the reinforcing rings. These bolsters 21 have flat bottom surfaces 22 which rest upon the bed 4 of the trailer body to provide stable support for the same. Left and right angles 23 and 24 respectively may extend between the two bolsters to provide additional rigidity and support for each tank.

The top of each tank is provided with a centrally positioned manway 26 to allow the tank to be filled. These manways are respectively in alignment with and may extend upwardly into spaced scuppers 27 and 28 in top wall 7 of trailer body 3. If the manway 26 on rear tank 16 extends into the scupper 27, such manway can be disconnected from the tank to permit selective removal of the rear tank from the trailer body 3.

Adjacent the bottom of each tank, a drain pipe 30 in fluid communication with the tank extends between the tank and access doors 31 in sidewall 5 of trailer body 3. Each drain pipe 30 is provided with conventional valving (not shown) to allow the tanks to be sealed for filling or to be opened for emptying.

Each tank as shown has a capacity of approximately 2000 gallons of liquid and takes up approximately 8 feet 9 inches of the trailer's length. The tanks are preferably insulated and heated and may be readily converted from food grade tanks to chemical tanks. The tanks are preferably close in size but are not necessarily of equal size, and the total fluid capacity may be somewhat greater than the 4000 gallons indicated. The term fluid tank as used herein generically contemplates and covers all grades and types of tank materials, all types of fluid tank cargos including liquids and gases and all forms and types of associated tank equipment or options.

When the tanks 15 and 16 are loaded, the trailer has a capacity of 4,000 gallons of liquid. The liquid load is equally distributed over the tractor running gear 14 and the rear trailer running gear 13. The bed 4 of the trailer body may be reinforced under the tanks or along its entire length readily to support the loading contemplated. When the liquid has been unloaded from the tanks 15 and 16, the trailer 2 of the present invention may readily be adapted to handle and transport dry freight in cargo compartment 17 between tanks 15 and 16. This dry cargo compartment 17 may respectively be defined at its front and rear ends by front bulkhead 33 and rear bulkhead 34. If used, these bulkheads extend across the hollow trailer body to provide containment and enclosure for the dry freight loaded into such compartment. Such dry freight may be loaded in at least two ways.

First, the dry freight may be side loaded through side door 11 into compartment 17. Second, the dry freight may be rear loaded through the rear end 9 of trailer body 3. To accomplish rear loading, the rear fluid tank 16 must be removed.

To facilitate removability, rear tank 16 is provided with two laterally spaced rectangular tubes 35 extending between and through the bolsters 21 to which they are connected. These tubes 35 are spaced to correspond to the spacing between the forks on forklift trucks. Such spacing allows the tubes 35 to receive the forks on a fork lift truck for removal and replacement of tank 16, when the same is not secured to trailer body 3.

To this latter end, clamping means, indicated generally at 37, are provided selectively to secure the rear tank 16 to the trailer body 3. For example, this clamping means may include eight hydraulic piston cylinder assemblies respectively mounted to the sidewalls of the trailer body. These piston cylinder assemblies are arranged to permit each reinforcement ring 20 to be engaged top and bottom on both sides to provide equal but opposite retaining forces on tank 16. Each of the eight hydraulic piston cylinder assemblies includes a cylinder housing 37, a piston (not shown) reciprocally movable in the cylinder, a piston rod 38 connected at one end to the piston and extending from cylinder housing 37 and a saddle 39 mounted on the free end of piston rod 38. The piston is spring biased to an extended position in which the saddle 39 clampingly engages and embraces the reinforcing ring 20. The bias of the spring may also be assisted by hydraulic pressure on the outboard side of the respective pistons to increase the clamping pressure exerted against the tank. To unclamp the tank 16, hydraulic pressure is exerted on the inboard side of the respective pistons to overcome the spring bias and simultaneously drive the respective saddles 39 outwardly away from the reinforcing rings 20. In the event of hydraulic system failure, the clamps are retained in their extended clamping position by the springs.

When the clamping means have been simultaneously disengaged by actuation of the hydraulic system, the tank may be picked up by a forklift and removed from the trailer body 3. When the tank 16 has been removed, the dry freight may then be loaded into the trailer from the freight dock. This rear loading procedure allows the freight to be moved through the rear opening 10 and into the dry freight cargo compartment 17. If rear bulkhead 34 is being used, such rear bulkhead is either removed from the trailer body 3 or an opening 34A is provided in the rear bulkhead 34 to provide access to the dry freight cargo compartment 17. When the dry freight compartment 17 is loaded, the rear tank 16 is repositioned in the trailer body 3 and then secured to the same by clamping means 37. The dry freight cargo load and tanks are then evenly distributed within the trailer for proper load distribution. The dry freight cargo compartment as shown is approximately 30'6" in its length and has 2,155 cubic feet of dry cargo space.

It will be apparent from the foregoing that changes may be made in the details of construction and configuration without departing from the spirit of the invention as defined in the following claims. For example, the front tank may be also be removable if desired and either or both tanks may be mounted to the bed outside the trailer body. In addition, the front tank can be insulated by packing insulative material around the tank, with such insulation being retained by the trailer body and front bulkhead. Moreover, other clamping mechanisms may be used to secure the removable rear tank to the trailer body, and such clamping mechanisms can be mounted on or a part of the bed and/or any other trailer body wall.

I claim:

1. A truck trailer adapted to carry dry and fluid freight comprising an elongated hollow trailer body having front and rear ends, a rear running gear movably supporting the trailer body adjacent the rear end of said trailer body, a first fluid carrying tank contained in said trailer body generally adjacent the front end of said trailer body, a second fluid carrying tank normally contained in said trailer body adjacent the rear end thereof and generally above said rear running gear, and a dry freight section between said first and second fluid carrying tanks, means releasably to secure said second fluid carrying tank to said trailer, an access means in said trailer body to permit said second fluid carrying tank to be removed from and inserted into said trailer body, said access means consisting essentially of an opening in the rear end of the trailer dimensioned to allow movement of the second fluid carrying tank therethrough, said second fluid carrying tank being adapted to be selectively removed from said trailer body through said access means to permit dry freight to be loaded through said access means into the dry freight section of said trailer body before reinserting the second fluid carrying tank, means selectively to fill and empty the first and second fluid carrying tanks, a rear bulkhead across said trailer body immediately in front of said second fluid carrying tank, said rear bulkhead having access doors therein selectively to permit dry freight to be passed through said rear bulkhead.

2. The truck trailer of claim 1 wherein said first fluid carrying tank has insulation packed between said first fluid carrying tank, said trailer body and a front bulkhead across said trailer body, said front bulkhead and trailer body cooperatively enclosing said first fluid carrying tank.

3. The truck trailer of claim 1 or 2 wherein said rear bulkhead is selectively removable from said trailer body.

4. The truck tailer of claim 1 wherein said first and second fluid carrying tanks are insulated.

* * * * *